United States Patent
Maschek

(10) Patent No.: US 7,372,641 B2
(45) Date of Patent: May 13, 2008

(54) CONTRAST REINFORCEMENT FOR DISPLAYS

(76) Inventor: Hubertus Maschek, Theodor-Heuss-Strasse 3, 86916 Kaufering (DE)

( * ) Notice: Subject to any disclaimer, the term of this patent is extended or adjusted under 35 U.S.C. 154(b) by 0 days.

(21) Appl. No.: 10/517,824

(22) PCT Filed: Jun. 13, 2003

(86) PCT No.: PCT/EP03/06281

§ 371 (c)(1),
(2), (4) Date: Aug. 8, 2005

(87) PCT Pub. No.: WO03/106890

PCT Pub. Date: Dec. 24, 2003

(65) Prior Publication Data

US 2006/0050411 A1    Mar. 9, 2006

(30) Foreign Application Priority Data

Jun. 14, 2002 (DE) ............... 102 26 606
Jul. 26, 2002 (DE) ............... 102 34 153
Dec. 9, 2002 (DE) ............... 102 57 451

(51) Int. Cl.
*G02B 9/08* (2006.01)

(52) U.S. Cl. .............. 359/739; 359/601; 345/617

(58) Field of Classification Search ........ 359/739, 359/601; 345/617
See application file for complete search history.

(56) References Cited

U.S. PATENT DOCUMENTS

| 4,392,077 A | 7/1983 | Libman et al. |
| 4,573,082 A | 2/1986 | Jeskey |
| 5,210,641 A | 5/1993 | Lewis |
| 6,249,375 B1 | 6/2001 | Otto et al. |
| 6,331,878 B1 * | 12/2001 | Takahara ................. 349/5 |
| 6,724,546 B2 * | 4/2004 | Nishimae et al. .......... 359/740 |
| 7,033,030 B2 * | 4/2006 | Sannohe et al. ............ 353/97 |
| 2003/0034935 A1 * | 2/2003 | Amanai et al. ............ 345/7 |
| 2006/0152806 A1 * | 7/2006 | Noguchi et al. ........... 359/557 |

FOREIGN PATENT DOCUMENTS

| DE | 693 26 611 T2 | 4/2000 |
| EP | 0 759 572 A | 2/1997 |

* cited by examiner

Primary Examiner—Jordan M. Schwartz
(74) Attorney, Agent, or Firm—Birch, Stewart, Kolasch & Birch, LLP

(57) ABSTRACT

The invention relates to a method and a device for contrast enhancement for display devices. A high-contrast representation of optical signals and/or symbols is achieved by providing a light-absorbing and/or light-deflecting background which is dark in comparison to the symbol or signal to be displayed and thus highlights said symbol or signal. The following invention enables a high-contrast representation of optical signals and symbols by the provision of a dark, light-absorbing background.

14 Claims, 2 Drawing Sheets

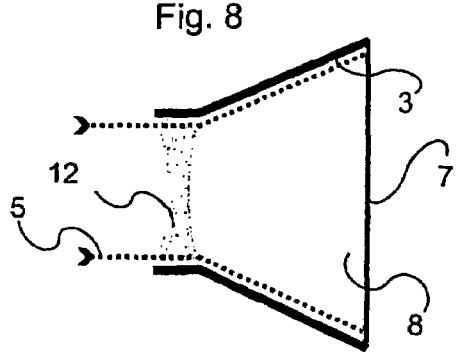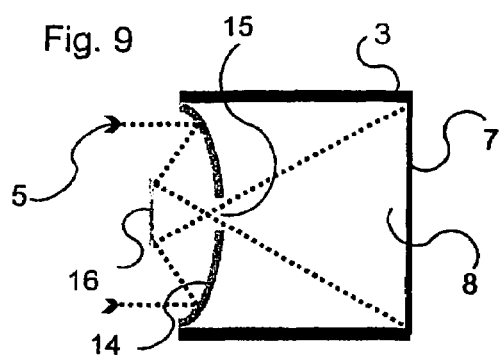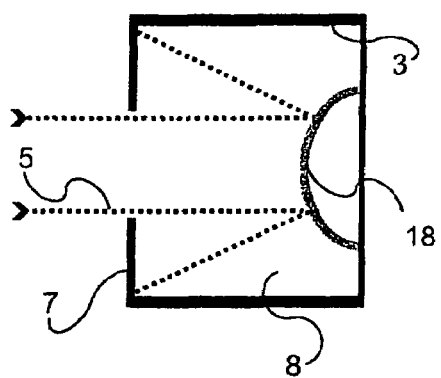

CONTRAST REINFORCEMENT FOR DISPLAYS

The invention relates to a method and a device for contrast enhancement for display devices. A high-contrast representation of optical signals and/or symbols is achieved by providing a light-absorbing and/or light-deflecting background which is dark in comparison to the symbol or signal to be displayed and thus highlights said symbol or signal. The following invention enables a high-contrast representation of optical signals and symbols by the provision of a dark, light-absorbing background.

BACKGROUND OF THE INVENTION

Optical displays are often hard to view in bright surroundings. For the purpose of counteracting this and heightening the contrast between the display and the surroundings, the light efficiency of the means must be increased which entails that more energy is consumed. Another possibility consists in the provision of shielding elements which are intended to shield the display from extraneous light incident on it. As a rule, such shielding means restrict the viewability of the display or shield it only insufficiently from incident extraneous light, such as, e.g., sunlight. Shielding the display from variable extraneous light, e.g. with a moving incident angle, often turns out to be difficult.

DE-T-693 26 611 discloses a device for preventing a false light phenomenon in a signal lamp, said device being provided between a light source and a cover lens and comprising a pair of complex spherical lenses in a specific arrangement and a shielding element positioned between said pair of lenses and having light-transmitting holes.

SUMMARY OF THE INVENTION

The present invention is therefore based on the object of providing a method and a device with which the contrast between display or signal and background or surroundings is heightened irrespective of the direction and the intensity of the incident extraneous light. A further object to be achieved with the present invention resides in overcoming further disadvantages of the prior art.

These objects are achieved with the features of the claims. The invention is based on the inventive concept that light incident on the device from the outside is directed through a lens to a means that absorbs and/or deflects the light so that a dark background is created. The brightness of said background is in contrast to the respective signal and/or symbol so that the latter can be clearly seen by the viewer. Furthermore, the light efficiency required for the clear visibility of the signal or symbol is reduced so that energy is saved.

In a preferred embodiment of the invention, the device comprises at least one converging lens, at least one apertured diaphragm as well as at least one means for absorbing light. The device further optionally comprises a light source. The converging lens, the apertured diaphragm and the absorption means are arranged in the mentioned order, the lens collecting the incident light and guiding it through the aperture to the absorption means. The absorption means exhibits preferably a light-absorbing preferably dark or black layer.

In a further preferred embodiment, the device comprises at least one converging lens, at least one apertured diaphragm as well as at least one means for deflecting or reflecting light. Furthermore, the embodiment optionally comprises a light source. As in the above-described preferred embodiment, the incident light is collected by the lens and directed through the aperture to the means for deflecting light.

A further preferred embodiment according to the invention consists in the combination of the two aforementioned embodiments, wherein the means arranged behind the diaphragm—relative to the direction of incidence of the light—is designed as a means for deflecting and absorbing light.

A further preferred embodiment of the invention comprises at least one divergent lens as well as at least one means for deflecting and/or absorbing light. In a further preferred embodiment, this device further comprises at least one light source.

In a further particularly preferred embodiment of the invention, the device comprises at least one light source in addition to the described features. In this connection, the device comprises preferably active and/or passive light sources. Active light sources are preferably configured as laser, incandescent lamp, light-emitting diode (LED), organic LED (OLED), electroluminescent foil (EL foil), neon tube, etc. Passive light sources, e.g., light valves or optical waveguides typically consist of a reflecting layer which reflects incident light. For this purpose, preferably the light incident on the device, also referred to as extraneous light, is utilized. In a particularly preferred embodiment, the reflecting layer is replaced with a liquid crystal display.

In a further preferred embodiment, the light of the light source is transmitted to the intended place via optical waveguides. In a further preferred embodiment, the device comprises light sources of different primary colours (e.g. RGB) so that in case of large-scale indication, for instance, various secondary colours can be represented with high contrast. In a further preferred embodiment, at least three light sources are provided for the three primary colours which jointly use one lens each.

The light source is preferably arranged in a further plane that is in front of, in or behind the lens. When the light source is positioned behind the lens, it is simultaneously used for focussing the emitted light. In further preferred embodiments, the light source can be arbitrarily positioned. In this connection, it is possible to use the device for generating a dark, preferably contrastive area.

In a further preferred embodiment, the light sources in their turn are provided with optical means. These means are preferably convex or concave lenses, mirrors and/or reflection elements, etc. When light or extraneous light is incident on the device, it is focussed in the lens and directed through the aperture to the means for deflecting or absorbing light. In said means, the light is deflected and/or absorbed, with the way back through the diaphragm being more or less blocked. This entails a significant contrast improvement, i.e., the display area is relatively dark even in bright surroundings or with direct insolation. When the light source is activated, a clearly visible light source with high contrast is the result.

In a preferred embodiment, the angle of radiation is determined via the position of the light source, which is arranged in front of, within, behind and/or beside the lens. In a further preferred embodiment, the angle of radiation is determined via the position of the light source relative to the focus of the lens. In a further preferred embodiment of the invention, the possible angle of incidence of the light to be absorbed is adjusted by the size of the aperture and/or the distance between lens and aperture/diaphragm. It is furthermore preferred that the preferential direction of the light or of the extraneous light to be absorbed, such as, e.g., sunlight, is adjusted by the position of the aperture. The contrast improvement is preferentially also adjustable by the size of the aperture.

Furthermore, the aperture is preferably variably adjustable as regards its size and position so that direct stray light, such as, e.g., sun rays or floodlight, etc., can be deflected into the area between the aperture and the means for deflecting and/or absorbing light or to said means. In a further preferred embodiment of the invention, the diaphragm has several apertures per lens.

In a further preferred embodiment, the means for absorbing or deflecting light comprises at least one area which reflects and/or absorbs the light directed to said means. This area is preferably large relative to the area of the lens in order to further heighten the contrast. Preferably, for greater extraneous light incidence, the described area is to be configured larger relative to the area of the lens. Furthermore, an enlargement of the area is preferably to be achieved by roughening it, inclining it relative to the incident light, structuring it by means of, e.g., an undulated surface, configuring a pyramid-like structure, etc.

In a further preferred embodiment, the means is realized as a cavity arranged directly behind the aperture. Preferably, said cavity has an inner surface that is suitable to absorb the incident light. This inner surface is preferably dark, black and/or coated. Preferably, the inner surface exhibits a layer of graphite and/or roughened graphite. Furthermore, the cavity and/or the inner walls of the means is/are preferably suitable to absorb light. The cavity has preferably a cylindrical, conical, spherical and/or cuboid configuration.

In a further preferred embodiment of the invention, the means and/or the cavity of the means comprise(s) further cavities and the area in front of and/or behind the aperture and/or the area behind the lens comprise(s) a preferably translucent material and/or fluid or is/are filled with it. The preferably translucent material and/or the fluid preferably comprise(s) a different refractive behaviour in comparison to the lens. The translucent material is preferably plastics. The fluid is preferably a gas and preferentially an inert gas.

In a further preferred embodiment of the invention, the device comprises only one lens or only lenses which is/are preferably arranged in front of and/or outside of the means for absorbing or deflecting light.

The described structure is preferably designed as an injection-moulded part with inserted glass or plastics lens and/or glass or plastics mirror.

In a preferred embodiment of the invention, all optical (translucent) parts are provided with an antireflective coating in order to further heighten the contrast. Preferably, the structure is to be realized black and/or considerably roughened to minimize reflections. In a further preferred embodiment, the device comprises at least one shield protecting it against extraneous light or sunlight incident under too steep an angle. The shield is preferably arranged at least partly around the lens.

In a further preferred embodiment, the light source itself is realized as a lens and/or an array of lenses (e.g. LED) and passes the incident light on as described above. In a preferred embodiment, the diaphragm is realized as a liquid crystal display. In the embodiment as a liquid crystal display, the size and/or position of the diaphragm and/or the aperture is/are preferably adjustable.

In a particularly preferred embodiment, the device and/or display of the device consist of several lenses and/or several light sources. A device system or array preferably consists of cuboid lenses without a distance and/or elongate lenses comprising a slit diaphragm.

In a preferred embodiment according to the invention, the arrangement is flat, cubical, cylindrical and/or a segment of a circle, etc., in order to, i.a., increase the angle of reflection.

In a preferred embodiment, when arranging devices of the invention in an array, the illuminated area can be selectively determined by a different position of the light sources relative to the focus of the associated lens. This entails, for instance, that, e.g., traffic lights are also viewable from directly below.

In a further preferred embodiment, when arranging the light sources asymmetrically relative to the focus of the lens, the area illuminated by the light source is adjustable.

In a further preferred embodiment, the contrast can be even further heightened by the use of several lenses and/or by reflection with the aid of mirrors and/or by enlarging the area of the means for absorbing and/or deflecting light.

In a further embodiment of the invention, the angle of incidence of the extraneous light can be determined with the aid of sensors so that the size of the diaphragm and/or its position can be adjusted accordingly. In a further preferred embodiment, the light efficiency of the light source can be reduced when there is no or little extraneous light or when a high contrast has been achieved.

Further preferred embodiments of the invention are realized in nanotechnology in order to manufacture small displays appropriate for daylight.

DESCRIPTION OF THE DRAWINGS

The invention is explained in the following by means of preferred embodiments and the drawings in which FIG. 8 shows a schematic representation of an eighth preferred embodiment of the invention, FIG. 9 shows a schematic representation of a ninth preferred embodiment of the invention, and FIG. 10 shows a schematic representation of a tenth preferred embodiment of the invention.

DESCRIPTION OF THE PREFERRED EMBODIMENTS

Figure 1:
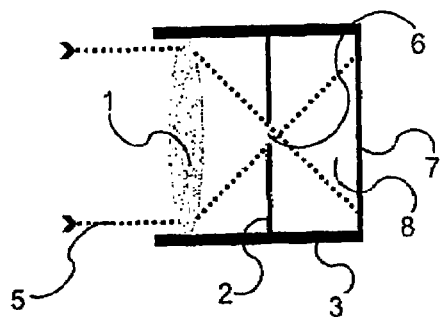
FIG. 1 shows a schematic representation of a first preferred embodiment of the invention.

FIG. 1 shows a preferred embodiment of a device according to the invention comprising a lens 1, a diaphragm 2 as well as a means 3 for deflecting and/or absorbing light. The lens 1, the diaphragm 2 and the means 3 are arranged such that light 5 incident from the outside is focussed by the lens 1 and directed through the aperture 6 to the means 3. The incident light 5 impinges on the means 3 at the area 7. In a preferred embodiment, the area 7 has light-absorbing properties so that it reflects only a small proportion of the light 5. For this purpose, the area 7 is preferably at least partially dark or black and/or exhibits a coating having absorbing properties. Graphite or roughened graphite, for example, belongs to this type of coating.

In a further preferred embodiment of the invention, the means 3 forms a cavity 8 extending behind the diaphragm 2. The inner surfaces of the cavity 8 exhibit preferably absorbing properties. This is preferably achieved by the preferred embodiments described in connection with the area 7. Light coming into the cavity 8 through the aperture 6 is thus partly absorbed and partly reflected at the inner surfaces of the means 3. Preferably, the light is reflected to a slight extent only, if at all. Reflected light in turn impinges onto another area of the inner surface of the means 3, where it is again absorbed and reflected to a slight extent only. This process recurs until the incident light has been absorbed completely or at least almost completely. Preferably, approximately 50% to 99.9999% of the incident light are absorbed. Since the aperture 6 of the diaphragm 2 is small relative to the inner surface of the means 3 and since the means 3 absorbs the incident light 5, no light comes back from the means 3 through the aperture 6. Since the lens 1 focuses all light coming through it through the aperture 6 to the means 3, where it is absorbed, the background of the lens 1, i.e., the front side of the diaphragm 2, remains dark since no light impinges onto the diaphragm 2. The dark area thus stands out contrastingly against the surroundings illuminated by the incident light 5. When a light source or a signal is positioned in the vicinity of the means 3, the means 3 is highlighted to a greater extent on account of the contrast to the dark area of the device and thus more clearly visible. Preferably, a contrast gain of approximately 50% to 99.9999% can be achieved with an embodiment according to the invention. The ratio of the area of the aperture 6 to the area of the light impinging onto the lens 1 is preferably 1:2 to 1:10,000 and particularly preferably 1:4 to 1:1,000.

In a further preferred embodiment, the means 3 is configured integrally with the diaphragm 2 and/or the housing of the device.

In a further preferred embodiment, the means for absorbing and/or deflecting light comprises reflecting elements and/or surfaces, such as, e.g., mirrors, etc. They reflect the incident light 5 such that it cannot get back through the diaphragm 2 and direct it to a place where it can be returned to the surroundings and/or absorbed (not shown).

In a further preferred embodiment of the invention, an additional medium is arranged in the means and/or in the cavity 8 of the means. In a particular embodiment of the invention this medium is preferably a translucent material and/or a fluid at least partially filling the means and/or the cavity 8. The medium has preferably a different refractive behaviour in comparison to the lens 1. In a preferred embodiment of the invention, the medium has properties by means of which the contrast-enhancing properties of the means 3 are supported or furthered.

In a preferred embodiment of the invention, the medium is a translucent material, preferably plastics. In a further preferred embodiment of the invention, the fluid is a gas, preferably an inert gas.

In further preferred embodiments, the area in front of and/or behind the diaphragm 2 and/or the area behind the lens 1 at least partly comprise(s) a medium of the above-described type. Preferably, further hollows and cavities required by the design may also comprise a medium of the described type. In a further preferred embodiment of the invention, the cavity 8 and/or the aforementioned areas are complete filled by a medium and/or replaced with it.

In a further or additional preferred embodiment of the invention, the device comprises only one lens 1 or only lenses 1 which is/are preferably arranged in the direction of light incidence in front of the diaphragm 2 and/or in the direction of light incidence in front of or outside the means 3 for absorbing or deflecting light. Preferably, the means 3 for absorbing or deflecting light does not comprise a lens 1.

Figure 2:
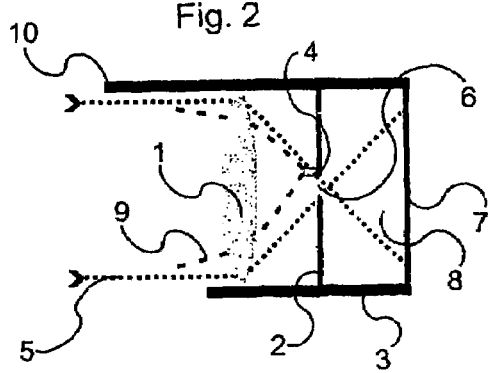
FIG. 2 shows a schematic representation of a second preferred embodiment of the invention.

In a particularly preferred embodiment, the device comprises at least one light source 4, as shown in FIG. 2. In the illustrated example, the light source 4 is arranged directly adjacent to the aperture 6. The light emitted by the light source 4 is converted by the lens 1 into a substantially parallel beam which is indicated in the Figure by the broken line 9. The light source 4 is preferably an active or passive light source. In a preferred embodiment according to the invention, both active and passive light sources, e.g., light valves or optical waveguides, are used. As active light sources 4, preferably lasers, incandescent lamps, light-emitting diodes (LEDs), electroluminescent foils (EL foils), neon tubes and/or organic LEDs (OLEDs), etc. are used. Passive light sources, e.g., light valves or optical waveguides 4 use the incident light, which they preferably reflect. For this purpose, the light sources 4 preferably comprise a reflective surface or layer. In a particularly preferred embodiment, the light source 4 is a liquid crystal display.

In a further preferred embodiment, the light source 4 is an area or is sheet-like and has an aperture in the size of a diaphragm or larger. This light source 4 is preferably realized as an OLED and/or comprises a fluorescing material or lamp(s).

The at least one light source 4 can alternatively be also arranged in front of, in and/or beside the lens 1. In the particularly preferred embodiments, the lens 1 is used to scatter the light 9 emitted by the light source 4.

In a further preferred embodiment of the invention, the light of at least one light source 4 is directed by means of at least one optical waveguide to a preferred place, preferably adjacent to the aperture 6. In further preferred embodiments of the invention, at least one light source 4 comprises further optical means, such as, e.g., lenses or mirrors. In a further preferred embodiment, the light sources 4 emit light of different colours. In a further preferred embodiment, the device comprises three light sources for each lens 4, each of which emits light of one of the three primary colours. Preferably, the three light sources 4 emit light of a different primary colour each.

According to a further or an additional embodiment of the invention, the device comprises a light source 4 in the direction of light incidence behind (in the drawing to the right of) the diaphragm 2 or in the means 3 for deflecting and/or absorbing the light, the cavity 8 and/or the area 7 (not shown). This light source 4 is preferably realized as an active light source 4 and particularly preferably as a laser or diode, wherein the light emitted by the light source reaches the outside in a directed or focussed manner through the aperture 6 and is preferably diverged or scattered by the lens 1. In this connection, the light source 4 is preferably configured or arranged such that it essentially does not influence the deflecting and/or absorbing properties of the means 3.

In a further preferred embodiment, the device comprises at least one shield 10, which is arranged in the vicinity of the lens 1 and protects the device or the lens 1 against light incidence from unfavourable angles of incidence.

Figure 3:
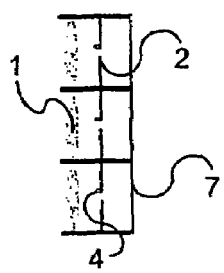
FIG. 3 shows a schematic representation of a third preferred embodiment of the invention.

FIG. 3 shows a preferred embodiment according to the invention, wherein the device comprises an arrangement of three devices as those described in connection with FIG. 1 and/or FIG. 2. The devices are preferably arranged beside each other and/or on top of each other. A large number of these devices may form a two-dimensional array.

In a particularly preferred embodiment according to the invention, several devices comprising a lens 1, a diaphragm 2, a means 3 having an area 7 and a light source 4 are arranged such that the lenses 1, the diaphragms 2 and the areas 7 are in one plane each.

Figure 4:
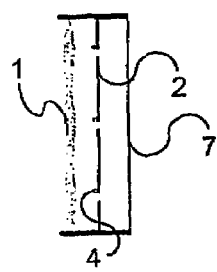
FIG. 4 shows a schematic representation of a fourth preferred embodiment of the invention.

FIG. 4 shows a particularly preferred embodiment of a device according to the invention, which comprises three lenses 1, one diaphragm 2 having three apertures 6 as well as one means 3 with an area 7. The individual features are preferably realized as described in connection with the above Figures. In particular, it is also possible that a plurality of lenses 1 and apertures 6 are provided, which are arranged, for instance, as a two-dimensional array.

The preferred embodiments described in FIGS. 3 and 4 preferably comprise elements having the same or equivalent features and/or properties. In a further preferred embodiment, the individual elements, such as, e.g., the lenses 1, the diaphragms 2, the apertures 6 or the means 3 have different features and/or properties. In a further preferred embodiment of the invention, the distance between lens 1 and diaphragm 2 is variably adjustable by means of the lens 1 and/or the diaphragm 2. In a further preferred embodiment, the position and/or size of the aperture 6 is/are variably adjustable. The device can preferably be adjusted according to the expected and/or given operating conditions by means of such adjusting possibilities. In a further preferred embodiment, the device comprises sensors which determine the angle of incidence and/or the intensity of the extraneous light 5, whereupon the diaphragm 2, the size of the aperture 6, the position of the aperture 6 and/or the distance between lens 1 and diaphragm 2 is/are adjusted or adjustable accordingly.

In a further preferred embodiment, the lens 1 is preferably square, rectangular, round or oval. When a device according to the invention comprises several lenses 1, said lenses 1 preferably have the same or different shapes and features.

In a further preferred embodiment, the aperture 6 is round, oval or a slit. In a preferred embodiment, elongate lenses 1 are used in combination with slit diaphragms 2.

Figure 5:
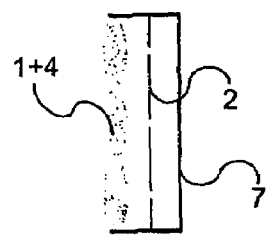
FIG. 5 shows a schematic representation of a fifth preferred embodiment of the invention.

FIG. 5 shows a preferred embodiment according to the invention, wherein the light source 4 or the light sources 4 itself/themselves is/are a lens/lenses 1. The light source(s) 4 or the lens(es) 1 directs/direct the incident light through the aperture(s) 6 to the (one or more) means 3 and emits/emit its/their own light 9. The combination of light source 4 and lens 1 as shown in FIG. 5 is preferably also used in connection with the other preferred embodiments of the invention.

In a further preferred embodiment, the light efficiency of the light source 4 is variably adjustable.

The focussing, emission, reflection and/or absorption of the device is supported by the preferred arrangement of the mirror element or elements. Furthermore, all optical and/or translucent elements of the device, such as, e.g., the lens 1 and/or the light source 4, are provided with an antireflective coating in order to prevent, for example, i.a. a reflection of the incident light 5 at the outer surface of the lens 1. In a further preferred embodiment, the non-optical elements of the device, such as, e.g., the diaphragm 2, the shield 10 and/or housing parts exhibit absorbing properties, for instance by a dark or black colour and/or a roughened surface. These elements are preferably coated with graphite and/or roughened graphite.

In a further preferred embodiment of the invention, the diaphragm 2 is a liquid crystal display.

Figure 6:
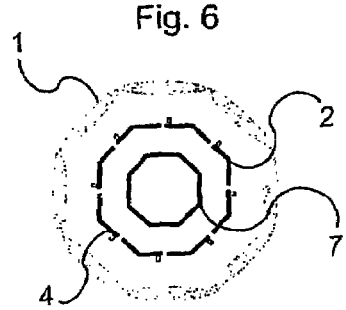
FIG. 6 shows a schematic representation of a sixth preferred embodiment of the invention.

FIG. 6 shows a preferred embodiment of the invention, wherein the device comprises several lenses 1, diaphragms 2 and light elements 4 as well as one or more means 3. They are arranged concentrically relative to each other as rings such that the lenses 1 have an extent of up to 360° in the circumference around the diaphragms 2 and the (one or more) means 3. Such an arrangement is preferably circular and/or polygonal. In further preferred embodiments, the device and/or an array of devices is flat, cubical, cylindrical and/or a segment of a circle, etc. Preferably, i.a., the angle of reflection thus can be increased.

Figure 7:
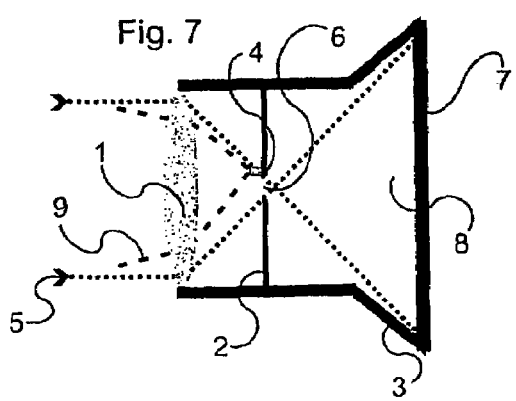
FIG. 7 shows a schematic representation of a seventh preferred embodiment of the invention.

FIG. 7 shows a preferred embodiment of the invention in which the means 3 exhibits an area 7 and/or inner surface of the cavity 8 which is/are modified in its/their form and/or is/are enlarged. In the shown example, the cavity 8 has a funnel-shaped expansion. Preferably, the area 7 and/or the inner surface of the cavity 8 of the means 3 is/are roughened, undulated, inclined relative to the incident light and/or pyramid-like structured, etc. Furthermore, the cavity 8 of the means is preferably cylindrical, conical, spherical and/or cuboid.

In a further preferred embodiment of the invention, the light source 4 is a liquid crystal display illuminated by the extraneous light.

FIG. 8 shows a further preferred embodiment of the invention, in which a light-scattering means that is preferably realized as a divergent lens 12 and thus replaces the diaphragm 2 is used instead of the lens 1. In the shown example, the device comprises a divergent lens 12 with concave surfaces as well as a means 3 with an area 7. The light coming through the divergent lens 12 is scattered, i.e. the light beam is diverged and directed to the preferably light-absorbing area 7. Preferred embodiments correspond to the above described ones.

In a further preferred embodiment of the invention, the device comprises at least one mirror and/or at least one mirror section. The mirror and/or mirror section is/are preferably at least partially curved and/or bent. FIG. 9 shows an example with a curved first mirror 14, which preferably is a paraboloidal-type reflector. In this example, an aperture 15 is provided approximately in the middle of the first mirror. A second mirror 16 is arranged at a distance relative to the direction of the incident light in front of the mirror 14. In the example, said second mirror 16 is a flat reflective area. The light 5 impinging onto the first mirror 14 is reflected to the second mirror 16 and directed by said second mirror to the aperture 15 in said first mirror. The arrangement and/or shape of the mirrors is/are selected such that the impinging light falls through the aperture 15 and impinges onto the area 7 arranged behind the aperture 15. The light is absorbed as described above in connection with the other examples. FIG. 10 shows an alternative embodiment in which a scattering mirror 18 is arranged in the cavity 8. The light 5 falling into the cavity is reflected at the scattering mirror 18 being configured as a convex mirror and is directed to the light-absorbing area 7.

In a preferred embodiment of the invention, the described design or means 3 can be manufactured as an injection-moulded part. The lens 1 as well as the mirror 14, 16, 18 are preferably configured as glass or plastics lenses and/or as mirrors. In a further preferred embodiment, they can be placed or inserted into the means 3 formed as an injection-moulded part.

Devices and methods according to the invention are preferably used in the field of traffic influence, such as, e.g., in connection with traffic lights, danger signs, signs giving directions, prohibiting signs, traffic guidance systems, etc.

In a further preferred embodiment, the device is realized in nanotechnology in order to manufacture small displays appropriate for daylight. Further devices according to the invention are used as a small display in the field of electronic devices, such as, e.g., calculators, radios, telephones, etc.

The technological background as well as the use and the field of application of the devices according to the invention show that they are preferably not restricted in terms of dimension but, depending on the case of application, may considerably differ in configuration, shape and/or dimension.

As regards their configurations, the individual features of the above-described preferred embodiments can be combined in any way in further preferred embodiments.

The device according to the invention has the advantage that the contrast of a display device or a signal device between display symbol and background is heightened so that the display or the signal can be more distinctly and clearly viewed by a viewer and/or the user. This proves to be practicable above all in applications at daylight or against the light. Furthermore, the device according to the invention enables the saving of energy since the light sources require less power due to the heightened contrast. In some preferred embodiments, no electrical power is required at all.

The invention claimed is:

1. A device for contrast enhancement for display devices, comprising
   a focusing optical device including a lens for focusing incident light,
   a diaphragm with at least one aperture arranged, relative to the incident light, behind the lens,
   a light disposal element for absorbing light arranged, relative to the incident light, behind the diaphragm, wherein the optical device is arranged such that it focuses incident light and directs it through the at least one aperture to the light disposal element for absorbing extra light, and
   at least one light source arranged between the focusing optical device and the diaphragm, wherein a lens is used for focusing the emitted light from the light source, the light source supplying illumination of a display element viewable by a viewer and wherein at least one light source is arranged beside the lens used for focusing the emitted light.

2. The device according to claim 1, wherein the light disposal element comprises an absorbing cavity arranged, relative to the incident light, behind the diaphragm.

3. The device according to claim 2, wherein the device comprises several diaphragms arranged adjacent to each other directing light to plural apertures.

4. The device according to claim 3, wherein the diaphragms and/or the apertures have different sizes.

5. The device according to claim 4, wherein the size of at least one of said apertures is adjustable.

6. The device of claim 3 comprising plural focusing optical devices, wherein the focusing optical devices correspond in number to said several diaphragms and are arranged in a regular pattern.

7. The device according to claim 1, wherein said focusing optical device is an elongate lens and wherein said diaphragm is a slit diaphragm.

8. The device according to claim 1, wherein the focusing optical device is separated from the diaphragm by an adjustable distance.

9. The device according to claim 1, wherein said light source is adjacent said diaphragm.

10. The device according to claim 9, wherein said light source passively reflects light.

11. The device according to claim 1, wherein the diaphragm is a liquid crystal element.

12. The device according to claim 9, wherein the light source is in the form of a structure that is sheet-like and has an opening, wherein the size of the opening is at least equal to the size of the diaphragm aperture.

13. The device according to claim 1, wherein the light disposal element absorbs extraneous light, the angle of incidence of the extraneous light being determined with the aid of sensors to facilitate adjustment of the position of the diaphragm, the size of the aperture and/or its position.

14. A method for contrast enhancement for display devices, comprising
    focusing an optical device including a lens for focusing incident light,
    providing a diaphragm with at least one aperture arranged, relative to the incident light, behind the lens,
    absorbing light using a light disposal element arranged, relative to the incident light, behind the diaphragm, wherein the optical device is arranged such that it focuses incident light and directs it through the at least one aperture to the light disposal element for absorbing extra light, and
    arranging at least one light source between the focusing optical device and the diaphragm,
    providing a lens for focusing the emitted light from the light source, the light source supplying illumination of a display element viewable by a viewer, and wherein at least one light source is arranged beside the lens used for focusing the emitted light.

* * * * *